United States Patent [19]

Hayakawa et al.

[11] Patent Number: 5,038,638

[45] Date of Patent: Aug. 13, 1991

[54] HYDRAULIC CONTROL DEVICE FOR AN AUTOMATIC TRANSMISSION

[75] Inventors: Youichi Hayakawa, Toyoake; Yoshinari Kuwayama, Tokoname; Yoshihiro Yamada, Anjo, all of Japan

[73] Assignee: Aisin AW Co. Ltd., Japan

[21] Appl. No.: 300,405

[22] Filed: Jan. 23, 1989

[30] Foreign Application Priority Data

Aug. 31, 1988 [JP] Japan ................................ 63-217954

[51] Int. Cl.$^5$ ............................................ F16H 61/00
[52] U.S. Cl. ........................................ 74/869; 74/867
[58] Field of Search ........................ 74/867, 868, 869

[56] References Cited

U.S. PATENT DOCUMENTS

| | | | |
|---|---|---|---|
| 3,895,542 | 7/1975 | Miyauchi | 74/868 |
| 3,968,707 | 7/1976 | Dach | 74/869 |
| 4,108,022 | 8/1978 | Arai et al. | 74/869 X |
| 4,476,747 | 10/1984 | Kawamoto | 74/868 X |
| 4,485,695 | 12/1984 | Kawamoto | 74/868 X |
| 4,674,364 | 6/1987 | Shindo et al. | 74/867 |
| 4,679,450 | 7/1987 | Hayakawa et al. | 74/868 X |
| 4,722,247 | 2/1988 | Shindo et al. | 74/867 X |
| 4,782,724 | 11/1988 | Furusawa et al. | 74/867 |
| 4,785,689 | 11/1988 | Iwatsuki et al. | 74/867 X |
| 4,843,917 | 7/1989 | Van Selous et al. | 74/868 |
| 4,949,597 | 8/1990 | Ueki et al. | 74/869 |

FOREIGN PATENT DOCUMENTS 63-13949 1/1988 Japan .

Primary Examiner—Allan D. Herrmann
Assistant Examiner—Khoi Q. Ta
Attorney, Agent, or Firm—Kanesaka and Takeuchi

[57] ABSTRACT

A sequence valve for the first brake ($B_1$) is installed, and the forward four speed modes are attained by two solenoid valves. At in the second speed mode of D range, hydraulic pressure is applied to the second brake hydraulic servo to restrain certain rotating element through the one-way clutch. After the application to the second brake hydraulic servo is completed, then the hydraulic pressure is applied to the sequence valve for the first brake, and through the sequence valve, the hydraulic pressure is applied to the first brake hydraulic servo. Accordingly, when up shifting from the first speed mode to the second speed mode, the shifting is conducted smoothly by the engagement of the second brake, after that the first brake is engaged. When up shifting from the third speed mode to the fourth speed mode, the first brake hydraulic servo is swiftly drained by the 3-4 shift valve. Consequently, the second clutch is engaged under the operation of the one-way clutch operated by the engagement of the second brake.

5 Claims, 6 Drawing Sheets

FIG.4

| POSITION | | SOLENOID | | | CLUTCH | | | BRAKE | | | | O.W.C | | |
|---|---|---|---|---|---|---|---|---|---|---|---|---|---|---|
| | | S1 | S2 | S4 | C1 | C2 | C3 | B1 | B2 | B3 | B4 | F1 | F2 | F3 |
| P | | × | ○ | | | | | | | | ○ | | | |
| R | V≤7 | × | ○ | | | ○ | | | | ○ | ○ | | | |
| | V>7 | ○ | ○ | | | ○ | | | | × | ○ | | | |
| N | | × | ○ | | | | | | | | ○ | | | |
| D | 1ST | × | ○ | | ○ | | | | | | ○ | | ○ | ○ |
| | 2ND | ○ | ○ | ◎ | ○ | | | ○ | ○ | | ○ | ○ | | ○ |
| | 3RD | ○ | × | ◎ | ○ | ○ | | ○ | ○ | | | ○ | | |
| | 4TH | × | × | ◎ | ○ | ○ | ○ | ○ | | | | | | |
| 3 | 1ST | × | ○ | | ○ | | | | | | ○ | | ○ | ○ |
| | 2ND | ○ | ○ | ◎ | ○ | | | ○ | ○ | | ○ | ○ | | ○ |
| | 3RD | ○ | × | ◎ | ○ | ○ | | ○ | ○ | | | ○ | | |
| | (3RD) | × | × | | ○ | ○ | | ○ | ○ | | | ○ | | |
| 2 | 1ST | × | ○ | | ○ | | | | | | ○ | | ○ | ○ |
| | 2ND | ○ | ○ | | ○ | | | ○ | ○ | | ○ | ○ | | ○ |
| | (3RD) | ○ | × | | ○ | ○ | | ○ | ○ | | | ○ | | |
| | (3RD) | × | × | | ○ | ○ | | ○ | ○ | | | ○ | | |
| 1 | 1ST | × | ○ | | ○ | | | | | ○ | ○ | | ○ | ○ |
| | 2ND | ○ | ○ | | ○ | | | ○ | ○ | | | ○ | | ○ |
| | (1ST) | × | × | | ○ | | | | | ○ | ○ | | ○ | ○ |
| REMARKS | ○ | ON | | | APPLIED | | | | | | | | | |
| | × | OFF | | | RELEASE | | | | | | | | | |
| | ◎ | ON: L-UP ON OFF: L-UP OFF | | | | | | | | | | | | |

HYDRAULIC CONTROL DEVICE FOR AN AUTOMATIC TRANSMISSION

BACKGROUND OF THE INVENTION

1. Field of the Invention

The present invention relates to a hydraulic control device for an automatic transmission, in particular to a hydraulic control device controlling four forward speeds by two solenoid valves.

2. Description of the Prior Art

As shown in Japanese Laid Open Patent No. Sho-63-13949, the applicant of the present invention has proposed a hydraulic control device for an automatic transmission attaining five or four forward speeds.

The automatic transmission has a planetary gear unit having a single planetary gear and a dual planetary gear, wherein the planetary gear unit uses a sun gear commonly for both single and dual planetary gears, and uses a carrier commonly for both single and dual planetary gears. And an output rotation is taken out from the common carrier. A forward first speed is obtained when transmission power is transferred from an input shaft to a ring gear (a small ring gear) of the single planetary gear, and a ring gear (a big ring gear) of the dual planetary gear is restrained; a forward second speed is obtained when the sun gear is restrained under the condition that the transmission power is still transferred to the ring gear of the single planetary gear; a forward third speed is obtained by rotating whole gear unit together; a reverse speed is obtained when transmission power is transferred from the input shaft to the sun gear, and the ring gear of the dual planetary gear is restrained. Due to the above arrangement, an automatic transmission attaining four or five forward speed modes is provided by the combination of a three or four speed automatic transmission mechanism and an under drive mechanism which changes an under-drive with a direct-drive.

Thus, parts and assembly lines for the four and five speed mode automatic transmission are commonly utilized to cope with the wide variation of the car types.

With reference to a hydraulic control device, for common utilization of the above four and five speed mode transmission, each shift valve is switched by a first, a second, a third solenoid valves to attain the forward four or five speed modes.

Furthermore, the following functions are incorporated: when a car stops under a D range state, occurrence of creeping is prevented; an idling control is made, which engages a forward clutch upon receiving signal for the first speed mode a reverse shift control is made, which prevents shift mode from coming into reverse mode even if the shift lever is shifted to the reverse range when running forward.

Though the above mentioned hydraulic control device is suitable for the five speed mode automatic transmission, in case that the device is used for the four speed mode transmission, it is not preferable to employ three expensive solenoid valves by considering production cost and the like. Under such circumstance, it is required to obtain the four speed mode automatic transmission with employing two solenoid valves.

SUMMARY OF THE INVENTION

The present invention is purposed to provide a hydraulic control device which attains forward four speed modes by two solenoid valves; has a common structure to be used for forward five speed mode transmission; furthermore, prevents shift shock; and applies engine brake at the second and third speed modes under coasting condition of the D range.

The present invention, taking the above-mentioned situation into consideration, provides, for example, as shown in FIG. 1, a hydraulic control device (U) for an automatic transmission, including hydraulic servos for frictional engaging elements (C1). (C2), (C3), (B1), (B2), (B3), (B4) to connect certain elements of a shift gear mechanism of the automatic transmission attaining four forward speed modes and one reverse speed mode, which includes a plurality of shift valves (5), (6), (7) to control hydraulic pressure working on the respective hydraulic servos; two solenoid valves (S1), (S2) to control the plurality of shift valves; and a manual value (9). The hydraulic servo (B2) operates for a second brake which is one of the frictional engaging elements and which engages or restrains certain element ($S_1$) (refer to FIG. 2) of the shift gear mechanism through a one-way clutch (F1) operating from forward second speed mode to forward fourth speed mode. The hydraulic servo (B1) operates for a first brake which is one of the frictional engaging elements and which directly engages and restrains the certain element (S1) of the shift gear mechanism. Furthermore a sequence valve (10) for the first brake is provided which has a first control chamber (10a) connecting to the hydraulic servo (B2) for the second brake, and a second control chamber (10b) connecting to a D range of the manual valve so that the sequence valve (10) is switched in accordance with hydraulic pressure applied to the first control chamber (10a) when hydraulic pressure is applied to both the control chambers (10a), (10b), and so that when a line pressure is applied to the hydraulic servo (B2) for the second brake, the sequence valve (10) is switched by applying hydraulic pressure based on the hydraulic servo (B2) for the second brake to the first control chamber (10a), and the line pressure is applied to the hydraulic servo (B1) for the first brake through the sequence valve (10) and the two shift valves (7). (5). In the forward forth speed mode, one of the two shift valves is switched to drain the hydraulic servo (B1) for the first brake quickly.

In addition to the above, for example as shown in FIG. 2, the shift gear mechanism (21) has a planetary gear unit (23) which is constituted by the combination of a single planetary gear (30) and a dual planetary gear (31), and the planetary gear unit (23) has a common sun gear ($S_1$) and a common carrier (CR1) which is an output member wherein a forward first speed is obtained when transmission power is transferred from an input shaft (29) to a ring gear (R1) of the single planetary gear (30), and a ring gear (R2) of the dual planetary gear is restrained; a forward second speed is obtained when the sun gear ($S_1$) is restrained under the condition that transmission power is still transferred to the ring gear (R1) of the single planetary gear (30); a forward third speed is obtained by rotating whole gear unit (23) together; a reverse speed is obtained when transmission power is transferred from the input shaft (29) to the sun gear ($S_1$), and the ring gear (R2) of the dual planetary gear ($S_1$) is restrained. The automatic transmission attains four forward speed modes and one reverse mode by the combination of the forward three speeds of the planetary gear unit (23) and a sub gear unit (25) which is constituted by a single planetary gear (33) and which changes an under-drive or an over-drive with a direct-drive.

Based on the above structure, when the manual valve (9) is shifted to the D range, and the line pressure ($P_L$) is applied to the D range port (D), under the condition of the forward second speed mode, the line pressure of the D range port is applied to the second brake hydraulic servo (B2) through the ports ($D_1$), ($a_1$) of the 1-2 shift valve (5) (a lowerhalf position). Based on the hydraulic pressure application to the servo (B2), the second brake ($B_2$) is engaged, with the engagement of the first (forward) clutch ($C_1$) which is applied with hydraulic pressure directly from the D range port, so that the forward second speed mode is obtained. Furthermore, after the second brake (B2) is engaged, the hydraulic pressure is applied to the first control chamber (10a) of the B1 sequence valve (10) through an oil passage (c) so that the port ($a_2$) and the port ($e_1$) are connected with opposing the hydraulic pressure working of the second control chamber (10b) of the valve (10) (the upper-half position) Accordingly, the line pressure is applied to the first brake hydraulic servo (B1) through the oil passage (a') separate from the passage (a), the port ($a_2$) and the port ($e_1$) of the sequence valve (10), the ports ($e_2$) and ($f_1$) of the 3-4 shift valve (7) (the lower-half position), the ports ($f_2$) and ($g_1$) of the 1-2 shift valve (5). Because of the above motion, the second brake (B2) is engaged, and after the certain element ($S_1$) is restrained through the one-way clutch (F1) with adequate torque capacity, the first brake (B1) is engaged, so that the element ($S_1$) is more securely restrained. Incidentally when coasting starts under the second speed mode and the third speed mode, the second brake (B2) does not function because the one-way clutch (F1) idles. However, the certain element ($S_1$) is directly restrained by the first brake (B1). thus the engine brake is actuated.

At the third speed mode at the D range, the second solenoid valve (S2) is OFF, and the 2-3 shift valve (6) is switched to the upper-half position. Under this state, the fourth brake hydraulic servo (B4) is drained through the ports ($h_1$), (d), and the line pressure is applied to the third clutch hydraulic servo (C3) through the ports ($p_1$). ($i_1$) of the shift valve (6). Further, the line pressure is applied to the back control chamber ($i_2$) of the 1-2 shift valve (5) through the oil passage (i').

At in the fourth speed mode at the D range, the first solenoid valve (S1) is also OFF, then the control pressure is applied to the control chambers (5a), (7a) of the 1-2 shift valve (5) and the 3-4 shift valve (7). However, as the line pressure is applied to the back control chamber ($i_2$) of the 1-2 shift valve (5), the valve (5) is kept under the lower-half position, and therefore, only the 3-4 shift valve (7) is switched (upper-half position). As a result, the line pressure through the oil passage (a) is kept applied to the second brake hydraulic servo (B2), and the port ($f_1$) is connected to the drain port (d). thus the first brake hydraulic servo (B1) is quickly drained by the regulating valve (76) and the like. Further, the ports ($a_3$) and ($j_1$) of the 3-4 shift valve (7) are connected, and the line pressure in the oil passages (a) is applied to the second brake hydraulic servo (C2) through the oil passage (j) and (k). At this moment, the release of the first brake (B1) is a little earlier than the engagement of the second clutch (C2), so that the second clutch (C2) is engaged under the operation of the one-way clutch (F1), thus smooth shift changes through the one-way clutch (F1) is performed.

Incidentally, the reference numerals in the parenthesis are used only for reference with the drawings and do not define the invention. The same number may be named differently in the following description and in the previous description in which broader concepts are adopted.

BRIEF DESCRIPTION OF THE DRAWINGS

FIG. 4 is a table of operation of the automatic transmission.

DETAILED DESCRIPTION OF THE PREFERRED EMBODIMENTS

The present invention will now be explained along with the drawings.

Figure 2:
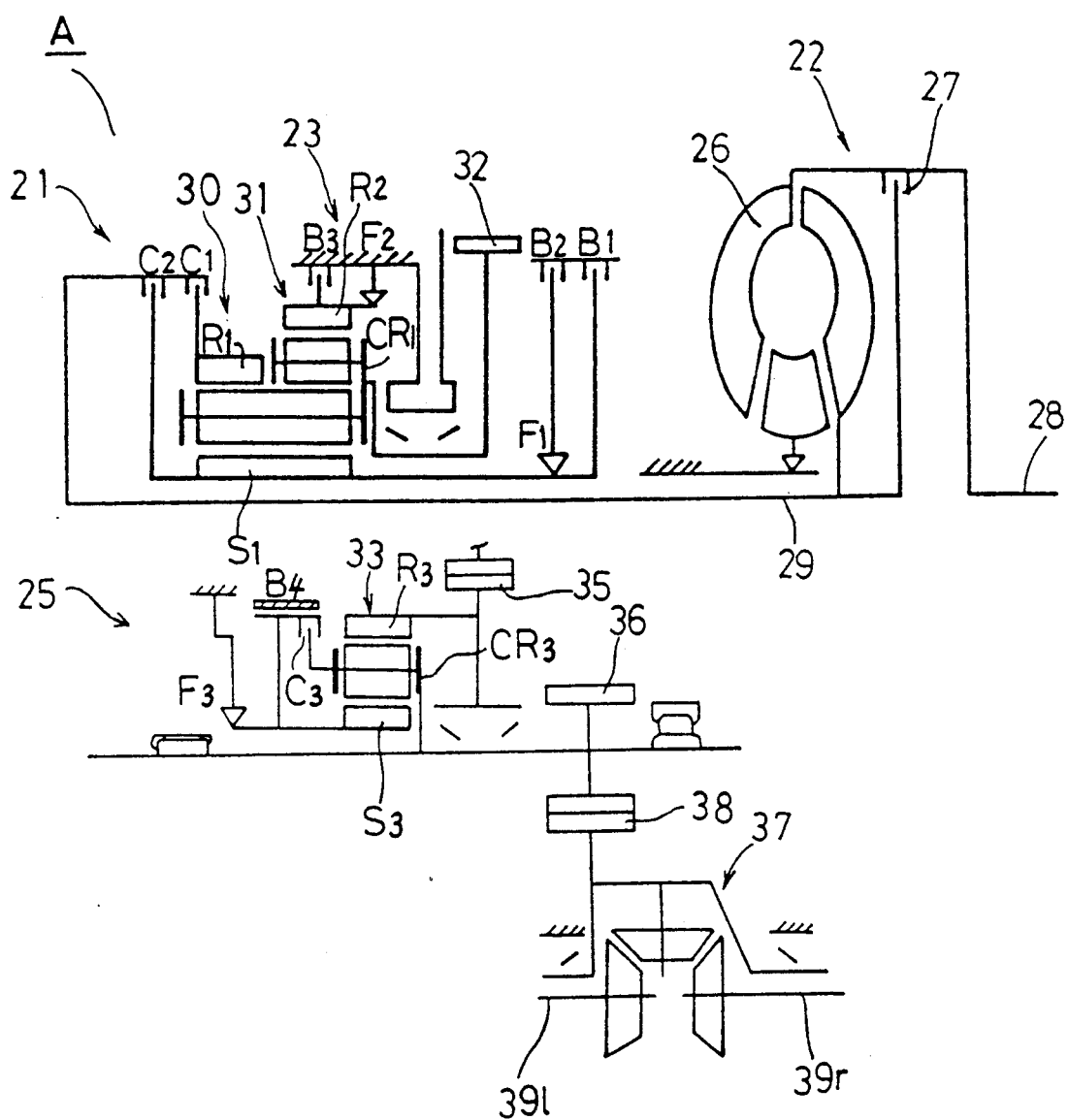
FIG. 2 is a schematic illustration of an automatic transmission suitable for the present invention.

Now referring to FIG. 2, an automatic transmission A includes a shift gear mechanism 21 having a three speed automatic transmission mechanism 21, a torque converter section 22, and an under drive mechanism 25.

The torque converter section 22 has a torque converter 26 and a lock-up clutch 27, whereby rotation of an engine crank shaft 28 is transmitted to an input shaft 29 through the torque converter 26 hydraulically, or through a mechanical connection of the lock-up clutch 27.

The three speed automatic transmission mechanism 23 has a planetary gear unit composed of a single planetary gear 30 and a dual planetary gear 31. In the planetary gear unit, sun gears of the two planetary gears are integrally linked, to form a common sun gear $S_1$, and carriers are integrally linked to form a common carrier CR1. The input shaft 29 and a ring gear R1 (a small ring gear) of the single planetary gear 30 are connected through a first (forward) clutch C1. The input shaft 29 and a sun gear $S_1$ are connected through a second (reverse) clutch C2. The sun gear $S_1$ is directly in one-way rotation by a second (2nd) brake B2 through a first one-way clutch F1. A ring gear R2 (a big ring gear) of the dual planetary gear 31 is restrained directly by a third (1st coast & reverse) brake B3 and is restrained in one-way rotation by a second one-way clutch F2. The carrier CR1 is connected to a counter drive gear 32 which is an output member for the three speed automatic transmission mechanism 23.

The under drive mechanism 25 has a single planetary gear 33, whose ring gear R3 is connected to a counter driven gear 35 which invariably meshes with the counter drive gear 32, a carrier CR3 is connected to an output pinion 36.

Further the sun gear $S_3$ is restrained directly by a fourth (under drive) brake B4 and is restrained by a one-way clutch F3. And the sun gear $S_3$ is connected to a carrier CR3 through a third (under drive direct) clutch C3.

The output pinion 36 is connected to a front differential device 37 through a ring gear 38, the differential device 37 has left and right front axle shafts 39l, 39r.

Figure 1A:
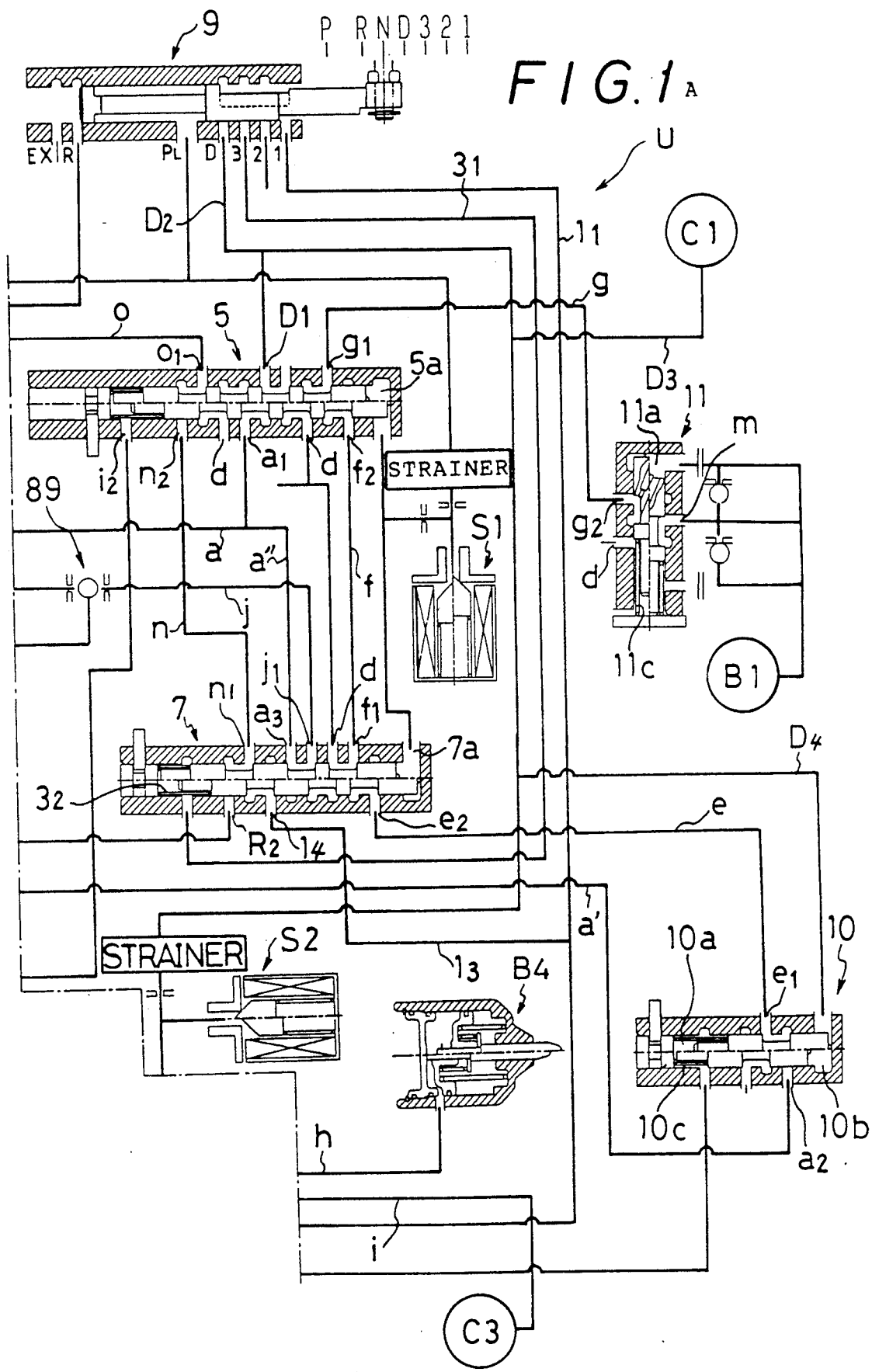
FIGS. 1A and 1B are cross sectional views of an important part of a hydraulic control device of the present invention.
Figure 1:
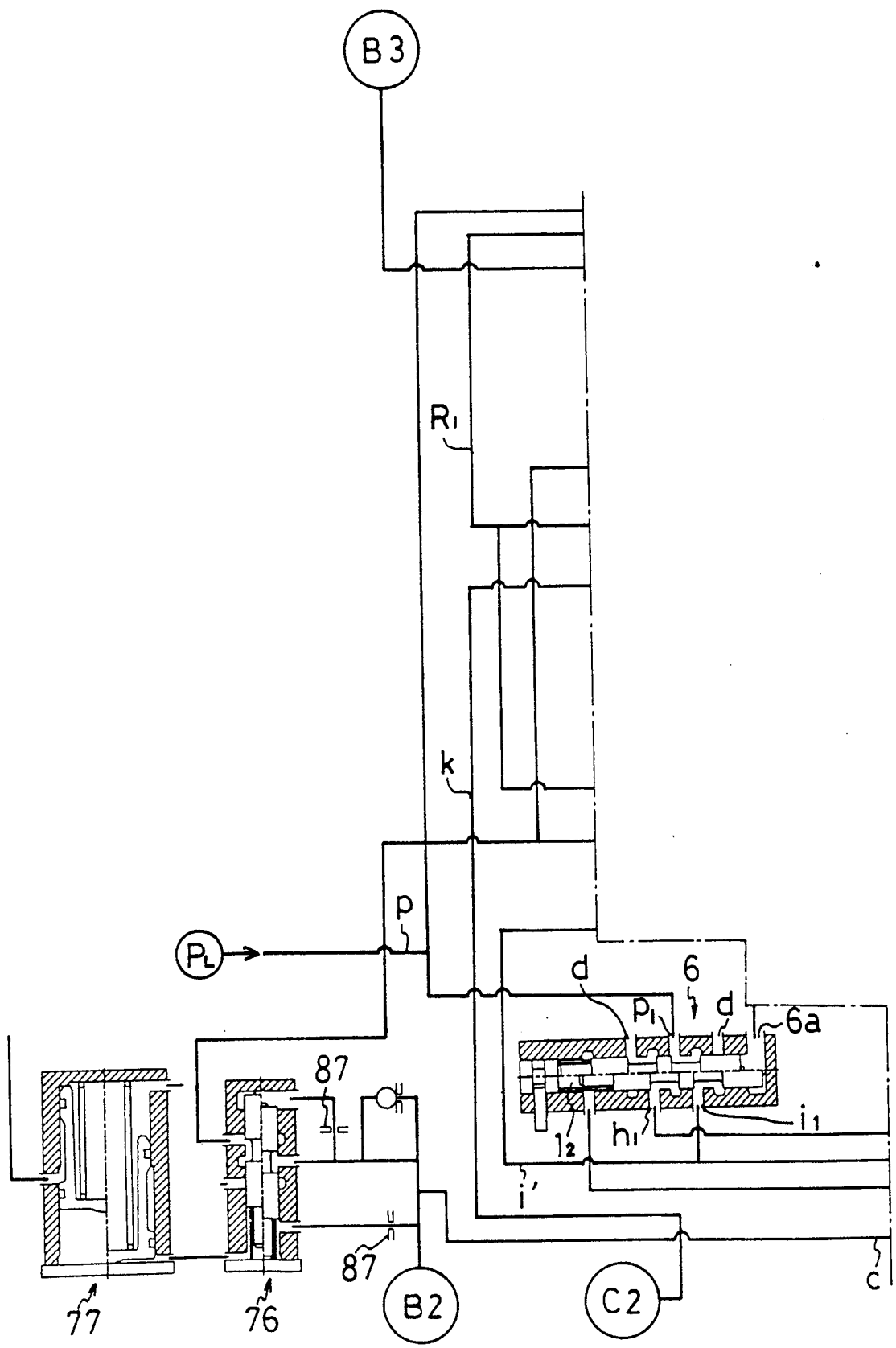
Figure 3:
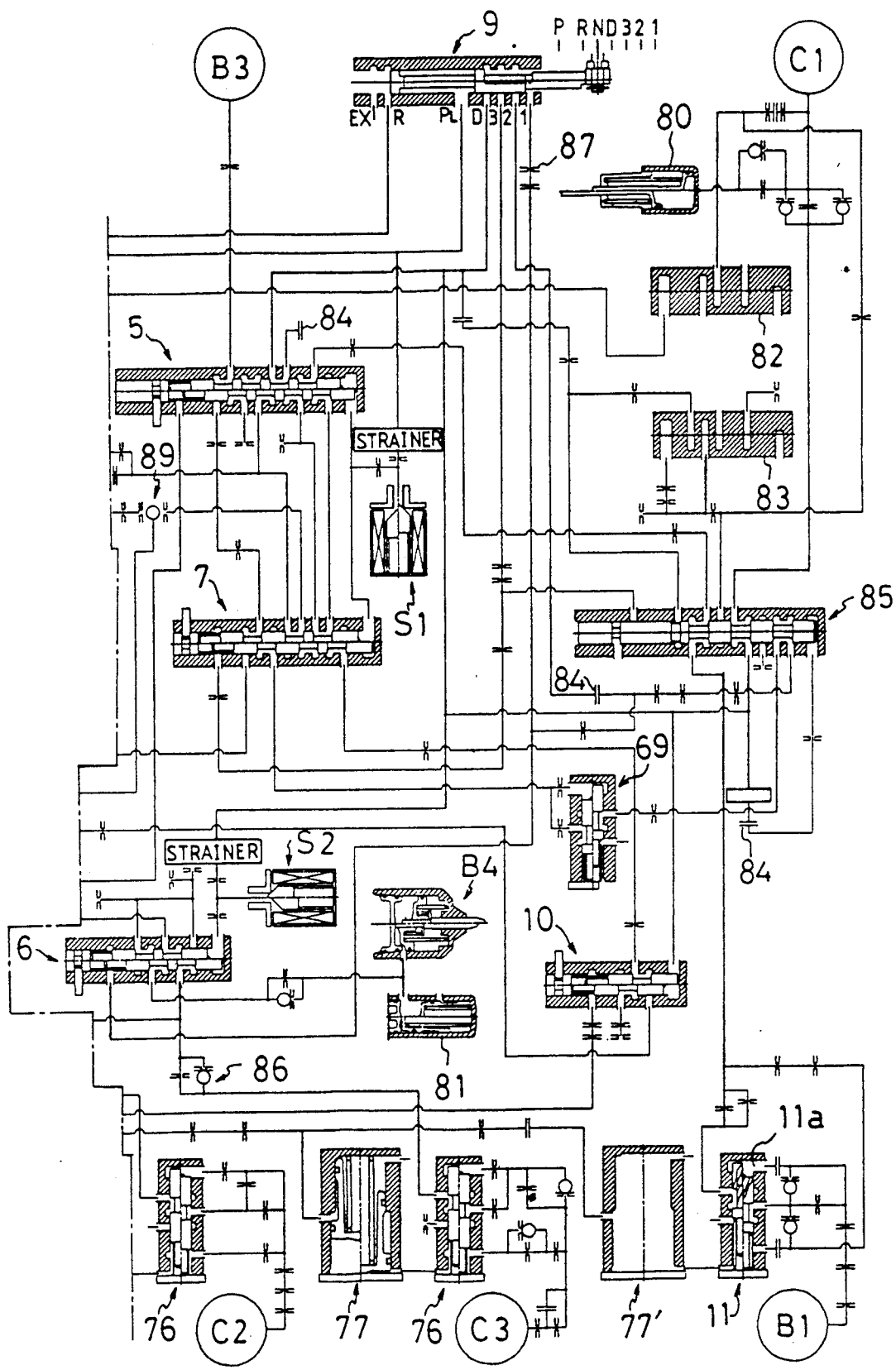
FIGS. 3A and 3B are hydraulic circuit diagram of the automatic transmission.
Figure 3:
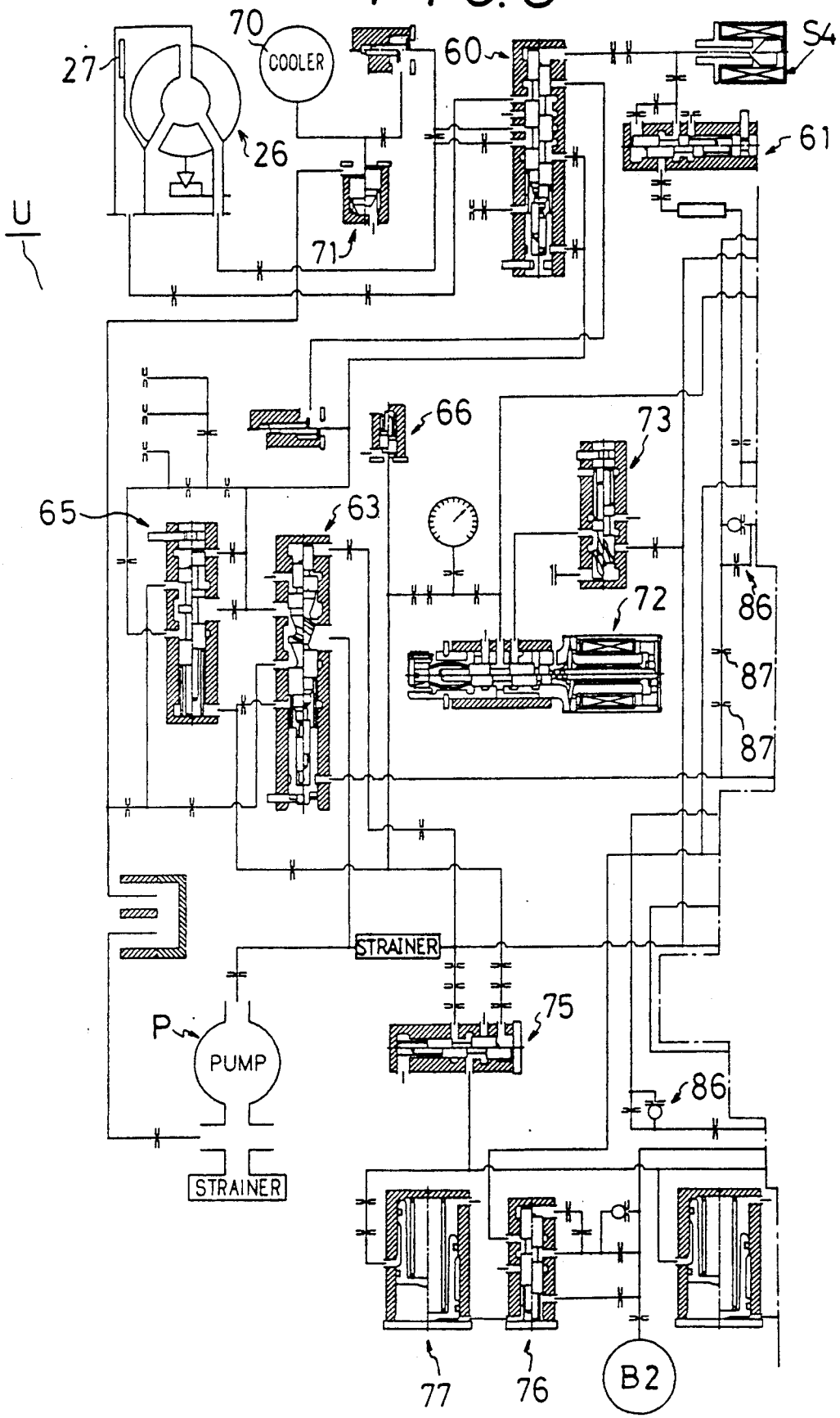

And the four speed automatic transmission A, as shown in FIG. 1 and FIG. 3, is controlled by a hydraulic circuit U.

In the circuit U, C1, C2, C3 are hydraulic servos for the clutches $C_1$, $C_2$, $C_3$, while B1, B2, B3, B4 are hydraulic servos for the brakes $B_1$, $B_2$, $B_3$, $B_4$. 9 is a manual valve, 5 is a 1-2 shift valve composing a first shift valve, 6 is a 2-3 shift valve composing a second shift valve, 7 is a 3-4 shift valve composing a third shift valve. S1 is a first solenoid valve controlling the 1-2 shift valve 5 and the 3-4 shift valve 7. S2 is a solenoid valve controlling the 2-3 shift valve 6, and 10 is a sequence valve for the first brake B1.

Moreover, as shown in FIG. 3, 60 is a look-up control valve, S4 is a fourth solenoid valve to duty-control the lock-up control valve 60, and 61 is a lock-up modulator valve to stabilize the duty-control of the solenoid valve. 63 is a primary regulator valve, 65 is a secondary regulator valve, 66 is a pressure relief valve, 69 is a low modulator valve. Furthermore 70 is an oil cooler, 71 is a cooler bypass valve, 72 is a throttle valve composed of a linear solenoid valve; which is capable of controlling hydraulic pressure freely, and 73 is a solenoid modulator valve stabilizing the control of the solenoid valve. 75 is an accumulator control valve. 26 is the torque converter, 27 is the lock-up clutch, P is an oil pump. And to each of the second clutch hydraulic servo C2, the third clutch hydraulic servo C3 and the second brake hydraulic servo B2, a regulating valve 76 and an accumulator 77 are connected. Incidentally, an accumulator 77' and a regulating valve 11 are connected to the first brake hydraulic servo B1, but the accumulator 77 is empty because of the provision for the five speed mode transmission, and the regulating valve 11, as shown in FIG. 1 in detail, is an input pressure regulating type in which the hydraulic pressure from an input port $g_2$ is connected to a control chamber 11a. Furthermore, setting type accumulators 80 and 81 are connected to the first clutch hydraulic servo C1 and the fourth brake hydraulic servo B4.

Incidentally, in FIG. 3, a symbol 84 like a condenser mark is a separator plate blocking oil passages. In addition 85 is a 4-5 shift valve used for five speed automatic transmission. However its control chamber is closed by a separator plate, so the valve 85 is not functioned. Due to the above structure the hydraulic control device U for the four speed automatic transmission is capable of being used as a valve body for a five speed automatic transmission.

Furthermore, in FIG. 3, 86 is an orifice-attached check valve which is placed at required spots. 87 is an orifice, 89 is a three way cut off cock (non manual type). Incidentally these orifice attached check valve 86 and orifice 87 are eliminated in FIG. 1.

Next, the operation of the present invention will be explained.

With regard to the four speed automatic transmission A, by shifting the manual valve 9 to each range, the first and the second solenoid valves S1, S2, and the fourth solenoid valve S4 for the lock-up clutch control, which are situated in the hydraulic control device U, are operated as shown in FIG. 4. Based on the motions of the solenoid valves, the clutches $C_1$, $C_2$ and $C_3$, the brakes $B_1$, $B_2$, $B_3$ and $B_4$ the one-way clutches F1, F2 and F3 operate, so that shifting speed from 1st to 4th is obtained at each range P, R, D, 3, 2, 1 of the manual valve.

Namely, when the manual valve is at D range, a line pressure port $P_L$ and a D range port of the manual valve 9 are connected, a line pressure in a line pressure passage p is applied to an oil passage $D_2$. At a first speed mode of D range, the first solenoid valve S1 is OFF which means a supply condition, and the second solenoid valve S2 is ON which means a drain condition.

Accordingly the 1-2 shift valve 5 and the 3-4 shift valve 7 are at upper-half positions, and the 2-3 shift valve 6 is at a lower-half position. Under this condition, the line pressure from the port D of the manual valve 9 is applied to the first clutch hydraulic servo C1 through the oil passage $D_2$ and an oil passage $D_3$, while the line pressure in the line pressure passage p is applied to the fourth brake hydraulic servo B4 through ports $p_1$, $h_1$ of the 2-3 shift valve 6, and a oil passage h. Because of the above motions, the first (forward) clutch $C_1$ is engaged and the fourth brake B4 operates.

As a result, rotation of the input shaft 29 is transmitted to the small ring gear R1 through the clutch $C_1$, and the big ring gear R2 is stopped by the second one-way clutch F2, so the sun gear $S_1$ idles reversely, the common carrier CR1 rotates in normal rotative direction with greatly reduced speed, and such reduced rotation is taken out from the counter drive gear 32 and transmitted to the counter driven gear 35 of the under drive (U/D) mechanism 25. The under drive mechanism 25 is under an under drive condition which in the fourth brake B4 and the third one-way clutch F3 operate. Consequently, in the automatic transmission A as a whole, a first speed mode is obtained by the combination of a first speed of the three speed automatic transmission mechanism 23 and the under drive condition of the under drive mechanism 25.

Incidentally, in the first speed, the B1 sequence valve 10 is switched to the lower-half position by applying the line pressure from the D range port D to a right (second) control chamber 10b of the valve 10 through the oil passage $D_2$ and an oil passage $D_4$.

At a second speed mode of D range, the solenoid valve S1 under the first speed mode is changed to turn ON and drained. Then the 1-2 shift valve 5 and the 3-4 shift valve 7 are switched to the lower half position. The line pressure from the port D is applied to the second brake hydraulic servo B2 through the oil passage $D_2$, the ports $D_1$, $a_1$ of the shift valve 5, the oil passage 'a' and the regulating valve 76. The hydraulic pressure is applied comparatively swiftly by the regulating valve 76, after that the pressure rises slowly by the effects of the orifice 87 and the accumulator 77, so that the second brake B2 is engaged smoothly. Accordingly, under this condition, the second brake B2 operates in addition to the first clutch C1. Then the sun gear $S_1$ is stopped by the operation of the first one-way clutch F1 based on the second brake B2, the rotation of the input shaft 29 is transmitted to the small ring gear R1, and the rotation of small ring gear R1 idles the big ring gear R2 in normal direction and rotates the carrier CR1 in normal rotating direction with reduced speed. Such reduced rotation is taken out from the counter drive gear 32 and transmitted to the counter driven gear 35 of the under drive mechanism 25. The under drive mechanism 25 is under the under drive condition, accordingly the automatic transmission A as a whole becomes the second speed mode by the combination of the second speed condition of the three speed automatic transmission mechanism 23 and the under drive condition of the under drive mechanism 25. After the second brake B2 is engaged, the hydraulic pressure to the second brake hydraulic servo B2 is applied to the left (first) control chamber 10a of the B1 sequence valve 10 through the oil passage c. By this, the B1 sequence valve 10 is switched to the upper-half position by the pressing force of the spring 10c and the control chamber 10a overcoming that of the right control chamber 10b. Under this stage, the line pressure is applied to a port $a_2$ of the B1 sequence valve 10 through the oil passage a' separate from the oil passage a. Furthermore, from the port $e_1$ of the valve 10, the line pressure is applied to the port $g_2$ of the regulating valve 11 through the oil passage e, the ports $e_2$, $f_1$ of the 3-4 shift valve 7, the oil passage f, the ports $f_2$, $g_1$ of the 1-2 shift valve 5, and the oil passage g. And the regulating valve 11 regulates the hydraulic pressure according to the applied pressure, and applies it to the first brake hydraulic servo B1. Thus the first brake $B_1$ is engaged. Consequently, at the time of up shifting from the first speed mode to the second speed mode, the second brake $B_2$ mainly operates, so the sun gear $S_1$ is stopped with adequate torque capacity, thus shift shock is prevented. Further after the up shifting is completed, the first brake $B_1$ is engaged, so the halt of the sun gear is secured, and a provision against excessive torque at starting is given and the engine brake operates at coasting.

At a third speed mode of D range, the second solenoid valve S2 under the second speed mode (supply condition). Then the 2-3 shift valve 6 is switched to the upper-half position. The line pressure in the line pressure passage p is applied to the third clutch hydraulic servo C3 through the ports $p_1$, $i_1$ of the 2-3 shift valve 6 and the oil passage i, and at the same time, the fourth brake hydraulic servo B4 is drained from a drain port d. Due to this motion, the three speed automatic transmission 23 remains under the second speed condition, and the under drive mechanism 25 is under the direct connecting condition by the release of the fourth brake H4 and the engagement of the third clutch C3. Accordingly, the automatic transmission A as a whole becomes the third speed mode by the combination of the second speed condition of the automatic transmission mechanism 23 and the direct connecting condition of the under drive mechanism 25. At this time, the line pressure is applied to the back control chamber $i_2$ of the 1-2 shift valve 5 through the oil passage i'.

At a fourth (4th) speed mode of D range, the first solenoid valve S1 under the third speed mode is switched to OFF (supply) condition. Then the control pressure is applied the control chamber 5a of the 1-2 shift valve 5 and the control chamber 7a of the 3-4 shift valve 7. However, the 1-2 shift valve 5 is kept at the lower-half position because of the control pressure of the hack control chamber $i_2$ and the spring pressing force, so only the 3-4 shift valve 7 is switched to the upper-half position. As a result, the line pressure from the port D is applied to the port $a_3$ of the 3-4 shift valve 7 through the oil passage $D_2$, the port $D_1$, $a_1$ and the oil passage a".

Further, the line pressure is applied to the three-way cock 89 (non manual type) through the port $j_1$ and the oil passage j, then the line pressure is applied to the second clutch hydraulic servo C2 through the oil passage r. While, based on the 3-4 shift valve 7 switched to the upper-half position, the port $f_1$ is connected to the drain port d, thus the line pressure working on the port $g_2$ of the regulating valve 11 is released. Due to this, in the regulating valve 11, the port m is connected to the drain port d because of the pressing force of the spring 11c. Thus the first (forward) clutch $C_1$ and the third clutch $C_3$ are engaged, and the second brake $B_2$ operates, in addition, the first brake $B_1$ is released and the second clutch $C_2$ is engaged. Then, the rotation of the input shaft 29 is transmitted to the small ring gear R1 through the first clutch $C_1$, and at the same time, transmitted to the sun gear S1 through the second clutch $C_2$.

Accordingly each element of the planetary gear unit rotates together, the same rotative speed as the input shaft is taken out from the carrier CR1. The rotation of the counter drive gear 32 is coupled to the under drive mechanism 25 at the direct connection condition, and then the fourth speed which is the same rotation speed as the input shaft 29 is taken out from the pinion 36. The automatic transmission A as a whole becomes the overdrive rotation based on the gear ratio of the pinion 36 and the ring gear 38. At this stage, the second brake hydraulic servo B2 is under engaged condition based on the constrained condition of the 1-2 shift valve 5 at the lower-half position. Consequently the first brake $B_1$ is released and the second brake $B_2$ is under engaged condition, the second clutch $C_2$ is engaged. Thus the clutch $C_2$ is engaged smoothly under the operation of the one-way clutch F1, so the shift shock by gear changes is prevented.

When the manual valve 9 is operated from the neutral (N) range to the reverse (R) range, the line pressure of the line pressure port $P_L$ is applied to the oil passage $R_1$ through the port R. Furthermore the line pressure of this oil passage $R_1$ is applied to the second clutch hydraulic servo C2 through the three way cock 89 and the oil passage k. At the shifting from the N range to the R range, when the vehicle is parking or running at slow speed (below 7 km/h), the first solenoid valve $S_1$ is OFF (supply condition). Accordingly the 1-2 shift valve 5 and the 3-4 shift valve 7 are under the upper-half position, the line pressure in the oil passage $R_1$ is led to the port $R_2$ of the 3-4 shift valve 7, further, the line pressure is applied to the port $n_2$ of the 1-2 shift valve 5 through the port $n_1$ and the oil passage n.

Thus the line pressure is applied to the third brake hydraulic servo B3 through the port $o_1$ and the oil passage o. Due to this, in the automatic transmission A, the second clutch $C_2$ is engaged and the third brake $B_3$ operates. Then the rotation of the input shaft 29 is transmitted to the sun gear $S_1$ through the second clutch C2 under this condition, the big ring gear R1 rotates reversely and the carrier CR1 rotates reversely, the rotation of the carrier is transmitted from the counter drive gear 32 to the under drive mechanism 25.

When the shifting from the N range to the R range, in the case that the vehicle runs at more than certain speed (7 km/h), based on the signals from vehicle speed sensor to the control unit (not shown), the control unit sends signals to the first solenoid valve S1. Then the first solenoid valve S1 is switched to drain, so that the 1-2 shift valve 5 and the 3-4 shift valve 7 are switched to the lower-half position. By this the ports $R_2$ and $n_1$ of the 3-4 shift valve 7 are disconnected, and the ports $n_2$ and $o_1$ of the 1-2 shift valve 5 are disconnected, and the port $o_1$ is connected to the drain port d. So the third brake hydraulic servo B3 is not applied with the line pressure and is drained. Accordingly the third brake $B_3$ is released, as a result, shifting to R range when running is prevented.

When the manual valve 9 is switched to the 3 range by the operation of the shift lever or the operation of switch, the line pressure in the line pressure port $P_L$ is connected to the 3 range port in addition to the D range port. The line pressure from the 3 range port is applied to the back control chamber $3_2$ of the 3-4 shift valve 7 through the oil passage $3_1$. At the 3 range, the first, second and third speed modes are as same as those of the D range.

However, in case that the solenoid valves S1 and S2 are under no electrified condition due to electric failures such as wire disconnection and the like, namely the (3RD) shown in FIG. 4, the 3-4 shift valve 7 is kept under the lower-half position based on the application of the line pressure to the back control chamber $3_2$ of the valve 7. Under this condition, the hydraulic pressure is applied to the first brake hydraulic servo B1 by connecting the port $e_2$ and $f_1$ of the valve 7, at the same time, the second clutch hydraulic servo C2 is drained by connecting the port $j_1$ to the drain port d, so that the third speed mode is maintained.

And, when the manual valve 9 is switched to the 2 range, the line pressure from the line pressure port $P_L$ is applied to the D range port D, the 3 range port 3 and the 2 range port 2. However, the oil passage from the 2 range port 2 is blocked by the separator 84, consequently at the 2 range, the first speed mode and the second speed mode are as same as those of the 3 range.

When the manual valve 9 is switched to the 1 range, the line pressure from the line pressure port $P_L$ is applied to the D range port D, the 3 range port 3, the 2 range port 2 and the 1 range port 1. The line pressure from the 1 range port is applied to the back control chamber $1_2$ of the 2-3 shift valve 6 through the oil passage $1_1$, at the same time, the line pressure is applied to the port $1_4$ of the 3-4 shift valve 7 through the oil passage 13 At the 1 range, at the first speed mode, the first clutch hydraulic servo C1 and the fourth brake hydraulic servo B4 are applied with the hydraulic pressure, in addition, the third brake hydraulic servo B3 is applied with the hydraulic pressure from the 1 range port 1 through the oil passages $1_1$, $1_3$, the ports $1_4$, $n_1$ of the 3-4 shift valve 7 which is under the lower-half position, the ports $n_2$, $o_1$ of the 1-2 shift valve 5 which is under the upper-half position. Because of this, the big ring gear R2 is restrained by the third brake B3, the engine brake operates when coasting. Incidentally, in case that the solenoid valves S1, S2 are off due to wire disconnection and the like, though the control pressure is applied to the control chamber $6a$, the 2-3 shift valve 6 is kept under the lower-half position because of the application of the line pressure to the back control chamber $1_2$. Under this condition, the ports $p_1$ and $h_1$ are connected, then the line pressure is applied to the fourth brake hydraulic servo B4, and the port $i_1$ is connected to the drain port d, so that the third clutch hydraulic servo C3 is drained. Thus the first speed mode is maintained.

When the manual valve 9 is at the R range, the line pressure is directly applied to the second clutch hydraulic servo C2 from the R range port, and the line pressure is applied to the third brake hydraulic servo B3 under the condition that the first solenoid valve S1 is off. Even if the second solenoid valve S2 is off, as the hydraulic pressure is applied to the second solenoid valve S2 from the D range port D, hydraulic pressure to operate the 3-4 shift valve 7 is not generated, so the 3-4 shift valve 7 is kept under the lower-half position, then the fourth brake B4 is engaged, the under drive mechanism 25 is under the under drive condition. Thus the reverse running is maintained.

As a result, under the condition of the solenoid valves S1, S2 all being off due to electric failures such as wire disconnection, when the manual valve 9 is shifted by the manual shift lever to the D range, the 3 range, the 2 range, the 1 range and the R range, the hydraulic control device is switched to the fourth speed mode, the third speed mode, the second speed mode, the first speed mode and the reverse mode corresponding to the above shift position of the manual valve 9.

TECHNICAL ADVANTAGES OF THE INVENTION

As explained, by quite simple modification such as installing the first brake sequence valve (10), the third solenoid valve can be eliminated under the condition that the hydraulic device is commonly utilized for the five speed, automatic transmission, so that it is possible to utilize the hydraulic device commonly with the five speed automatic transmission without causing cost increase.

When the up shifting from the first speed mode to the second speed mode, as the first brake ($B_1$) operates after the second brake ($B_2$) is completely engaged, the second brake ($B_2$) is smoothly engaged under adequate engaging condition by the torque capacity of the brake ($B_2$) and the regulating valve (76) and so on, so that shift shock is prevented. Furthermore, at the second and third speed modes of the D range, the first brake ($B_1$) engages so that the shift gear mechanism (21) is securely stopped to be a backup means against excessive torque, and the engine brake is actuated when coasting.

When the up shifting from the third speed mode to the fourth speed mode, the first brake ($B_1$) is swiftly released, certain frictional engaging element ($C_2$) is engaged under the operation of the second brake ($B_2$) through the one-way clutch (F1), so that shift shock during gear changes is prevented.

What is claimed is:

1. A hydraulic control device for an automatic transmission with a case, said automatic transmission including:
    an input shaft,
    an output shaft,
    a planetary gear unit for providing three forward speed modes and having first and second elements connected to the input shaft, a third element connected to the case, a fourth element operatively connected to the output shaft, and a plurality of friction devices, said friction devices including first clutch means connected between the input shaft and the first element for attaining three forward speed modes, second clutch means connected between the input shaft and the second element for attaining a high speed mode, first brake means connected between the second element and the case for attaining an intermediate speed mode, second brake means connected between the second element and the case for attaining the intermediate and high speed modes, a one-way clutch connected in series between the second element and the second brake means and operating at the intermediate and high speed modes, and third brake means connected between the third element and the case for attaining a low speed mode,
    said hydraulic control device comprising,
    a hydraulic fluid pressure source connected to the first clutch means,
    shift valve means for connecting the hydraulic fluid pressure source to the friction devices and having a first shift valve connected between the hydraulic fluid pressure source and the first and second brake means for attaining the low and intermediate speed modes, and a second shift valve connected between the hydraulic fluid pressure source and the first brake means and the second clutch means for attaining the intermediate and high speed modes, and sequence valve means for engaging the first brake means after engaging the second brake means when a shift is changed to the intermediate speed mode from the low speed mode, said sequence valve means being provided between the hydraulic fluid pressure source and the second shift valve for applying hydraulic fluid from the hydraulic fluid pressure source to the first brake means through the second shift valve and the first shift valve, said sequence valve means having a first control chamber connected to the second brake means for connecting the first brake means to the hydraulic fluid pressure source through the first and second shift valves and the sequence valve means, and a second control chamber connected to the hydraulic fluid pressure source so that the first brake means is connected to the hydraulic fluid pressure source through the sequence valve means after the second brake means is connected to the hydraulic fluid pressure source through the first shift valve to thereby connect the first control chamber to the second brake means.

2. A hydraulic control device according to claim 1 wherein said shift valve means further includes a solenoid valve connected between the first shift valve and the second shift valve for connecting the hydraulic fluid pressure source to the second brake means through the first shift valve and to the first brake means through the sequence valve, the second shift valve and the first shift valve when the intermediate speed mode is attained.

3. A hydraulic control device according to claim 1 wherein said third brake means includes a third friction brake and a one-way clutch connected between the third element and the case.

4. A hydraulic control device according to claim 1 wherein said automatic transmission further includes:
an under-drive mechanism connected between the fourth element and the output shaft and including a planetary gear mechanism having a sun gear, a carrier connected to the output shaft and a ring gear connected to the fourth element,
a third clutch connected between the sun gear and the carrier for attaining the intermediate speed mode and the high speed mode, and
fourth brake means connected between the sun gear and the case for attaining a first lower speed mode lower than the low speed mode and a second lower speed mode lower than the intermediate speed mode.

5. A hydraulic control device according to claim 1 wherein said planetary gear unit comprises a single planetary gear and a dual planetary gear,
said single planetary gear including a sun gear, a first pinion gear, a first carrier connected to the first pinion gear, and a first ring gear,
said dual planetary gear including said sun gear, double pinion gears with the pinion gear of the single planetary gear, a second carrier connected to the double pinion gears, and a second ring gear,
wherein said first, second third and fourth elements are said first ring gear, sun gear, second ring gear, and second carrier, respectively.

* * * * *